United States Patent
Horng et al.

(10) Patent No.: US 6,869,221 B2
(45) Date of Patent: Mar. 22, 2005

(54) WASHER HAVING OIL-BEARING HOLES

(75) Inventors: Alex Horng, Kaohsiung (TW);
Yin-Rong Hong, Kaohsiung (TW);
Ching-Sheng Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 46 days.

(21) Appl. No.: 10/247,491

(22) Filed: Sep. 20, 2002

(65) Prior Publication Data
US 2004/0057641 A1 Mar. 25, 2004

(51) Int. Cl.⁷ ................................................ F16C 1/24
(52) U.S. Cl. ........................................ 384/371; 384/425
(58) Field of Search .................................. 384/371, 368, 384/370, 425

(56) References Cited

U.S. PATENT DOCUMENTS 2,871,069 A * 1/1959 Weber ........................ 384/420

* cited by examiner

Primary Examiner—Lenard A. Footland
(74) Attorney, Agent, or Firm—Bacon & Thomas, PLLC

(57) ABSTRACT

A washer in accordance with the present invention mainly comprises an axial hole and a plurality of oil-bearing holes. The oil-bearing holes are connected an outer surface of the washer to an inner surface, and surround the axial hole.

1 Claim, 5 Drawing Sheets

WASHER HAVING OIL-BEARING HOLES

BACKGROUND OF THE INVENTION

1. Field of the Invention

The present invention is related to a washer having oil-bearing holes and more particularly to a washer applied to an end surface of a sleeve bearing, so that the oil-bearing holes may reservoir oil to thereby increase the rotational efficiency of a shaft received in the bearing.

2. Description of the Related Art

A conventional washer is applied to prevent a fan wheel from contacting with other motor members and an oil-pregnant bearing to thereby reduce abrasion therebetween. Nevertheless, the singular function of the conventional washer is merely capable of preventing the fan wheel from contacting with other motor members. In addition, the conventional washer is rotated by rotation of the fan wheel and thus results in a specific abrasion with an end surface of the oil-pregnant bearing. Consequently, there is a need for a reduction of the abrasion of the bearing.

The inner lubricant of a conventional sleeve bearing may be leaked automatically or forced to leak by a rotating shaft after long-term use. Accordingly, the lubricity of the inside of the bearing is reduced gradually that the bearing results in a relative decrease in the rotational efficiency of a shaft received therein. A specific leakage of the inner lubricant occurs in the ends of the bearing. Consequently, there is a need for an additional member to prevent the bearing from the leakage.

In order to attenuate the lubricant leakage on the end surface of the bearing, it is provided with an oil-circulated manner. To this end, the leakage of the outer lubricant is guided into the inside of the bearing through a guiding groove. However, the leakage of the outer lubricant from the bearing must reservoir on the end surface of the bearing for a while. On the one hand it can avoid the lubricant leakage, and on the other hand it can reduce an abrasion between the washer and the end surface of the bearing. For instance, both of an increase of lubricant layer and a decrease of the total contact area between the washer and the end surface of the bearing is capable of reducing the abrasion.

The present invention intends to provide a washer having oil-bearing holes connecting an outer surface to an inner surface to thereby guide the lubricant leaking from an axial hole of the washer to form a lubricant layer on an end surface of a bearing in such a way to mitigate and overcome the above problem.

SUMMARY OF THE INVENTION

The primary objective of this invention is to provide a washer having oil-bearing holes which connect an outer surface of the washer to an inner surface to thereby reduce a total contact area between the inner surface of the washer and an end surface of a bearing for attenuating the abrasion.

The secondary objective of this invention is to provide the washer having oil-bearing holes which connect an outer surface of the washer to an inner surface to thereby guide the lubricant leaking from an axial hole of the washer to form a lubricant layer on an end surface of a bearing for increasing the lubricity.

The washer in accordance with the present invention mainly comprises an axial hole and a plurality of oil-bearing holes. The oil-bearing holes are connected an outer surface of the washer to an inner surface, and surround the axial hole.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
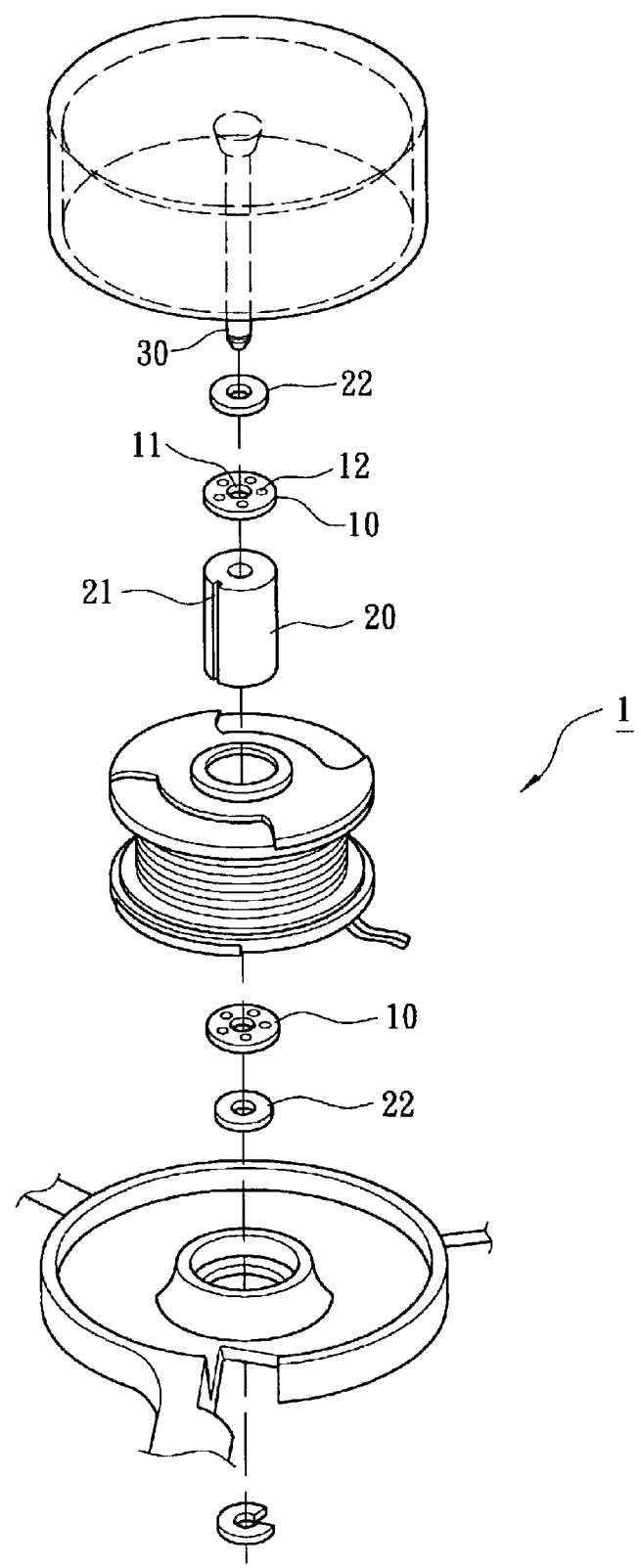
FIG. 1 is a perspective view of a washer having oil-bearing holes assembling in a motor in accordance with a first embodiment of the present invention.

Referring now to the drawings, there are four embodiments of the present invention shown therein, all of which include generally a primary washer member and a secondary motor member.

Figure 2:
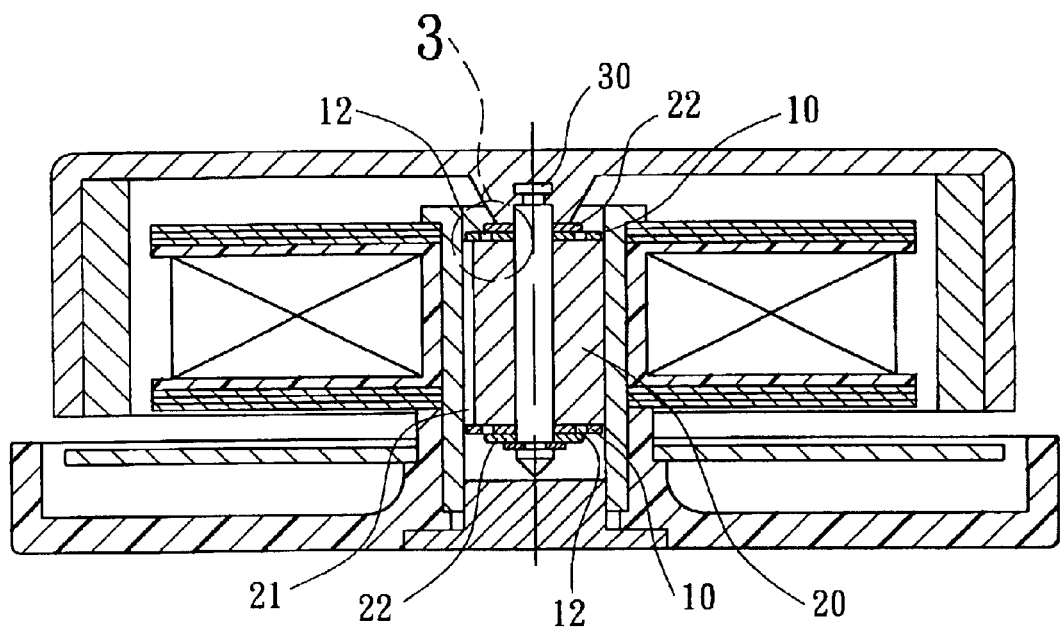
FIG. 2 is a sectional view of the washer having oil-bearing holes assembled in the motor in accordance with the first embodiment of the present invention.

Referring initially to FIGS. 1 and 2, a motor designated as numeral 1 includes a washer designated as numeral 10, a sleeve bearing designated as numeral 20, an elastic member designated as numeral 22, and a shaft designated as numeral 30. The washer 10 is a circle plate with a predetermined thickness. In assembling, the washer 10 is sandwiched in between an end surface of the sleeve bearing 20 and the elastic member 22. The washer 10, the sleeve bearing 20, and the elastic member 22 are axially nested in the motor 1.

The term "inner surface", as used herein, means a surface of the washer 10 adjacent to a surface of the sleeve bearing 20. Similarly, the term "outer surface", as used herein, means a surface of the washer 10 opposite to the inner surface adjacent to the bearing 20.

Construction of the washer 10 shall be described in detail, referring again to FIGS. 1 and 2. The washer 10 in accordance with a first embodiment of the present invention includes an axial hole 11, and a plurality of oil-bearing holes 12. The axial hole 11 and oil-bearing holes 12 connect an outer surface of the washer to an inner surface. The oil-bearing holes 12 are through holes surrounding an outer periphery of the axial hole 11.

Figure 3:
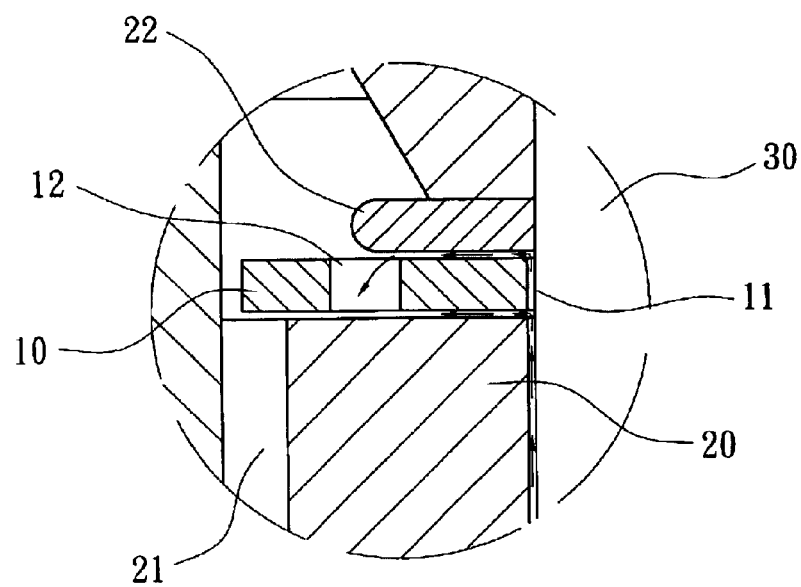
FIG. 3 is an enlarged partial view in FIG. 2 of the washer having oil-bearing holes in accordance with the first embodiment of the present invention.

Assembling the washer 10 in the motor 1 shall now be described with reference to FIGS. 2 and 3. The outer surface of the washer 10 is confronted with a surface of the elastic member 22 while the inner surface of the washer 10 is confronted with an end surface of the sleeve bearing 20. The oil-bearing holes 12 round the outer periphery of the axial hole 11 are adapted to collect the leakage lubricant from the sleeve bearing 20. Subsequently, the leakage lubricant in the oil-bearing holes 12 may form a lubricant layer between the inner surface of the washer 10 and the end surface of the sleeve bearing 20. The sleeve bearing 20 further comprises a circulating groove 21 for circulating the leakage lubricant collected in the oil-bearing holes 12.

Referring again to FIGS. 2 and 3, when the shaft 30 is rotated in the sleeve bearing 20, the inner lubricant of the sleeve bearing 20 may leak along the shaft 30 and the leakage lubricant may return to the sleeve bearing 20 in direction of the arrows. Some leakage lubricant may flow into a gap between the inner surface of the washer 10 and the end surface of the sleeve bearing 20 while the other leakage lubricant flowing onto the outer surface of the washer 10. The leakage lubricant on the outer surface of the washer 10 may flow back into the oil-bearing holes 12. Meanwhile, the backflow of the leakage lubricant collected in the oil-bearing holes 12 thereby perform buoyancy between the inner surface of the washer 10 and the end surface of the sleeve bearing 20. On the other hand, the total contact area between the inner surface of the washer 10 and the end surface of the sleeve bearing 20 may be reduced due to the oil-bearing holes 12. Consequently, both of the collecting lubricant layer and the reduced contact area between the washer 10 and the sleeve bearing 20 may result in an increase of the rotational efficiency of the shaft 30 received in the sleeve bearing 20.

Figure 4:
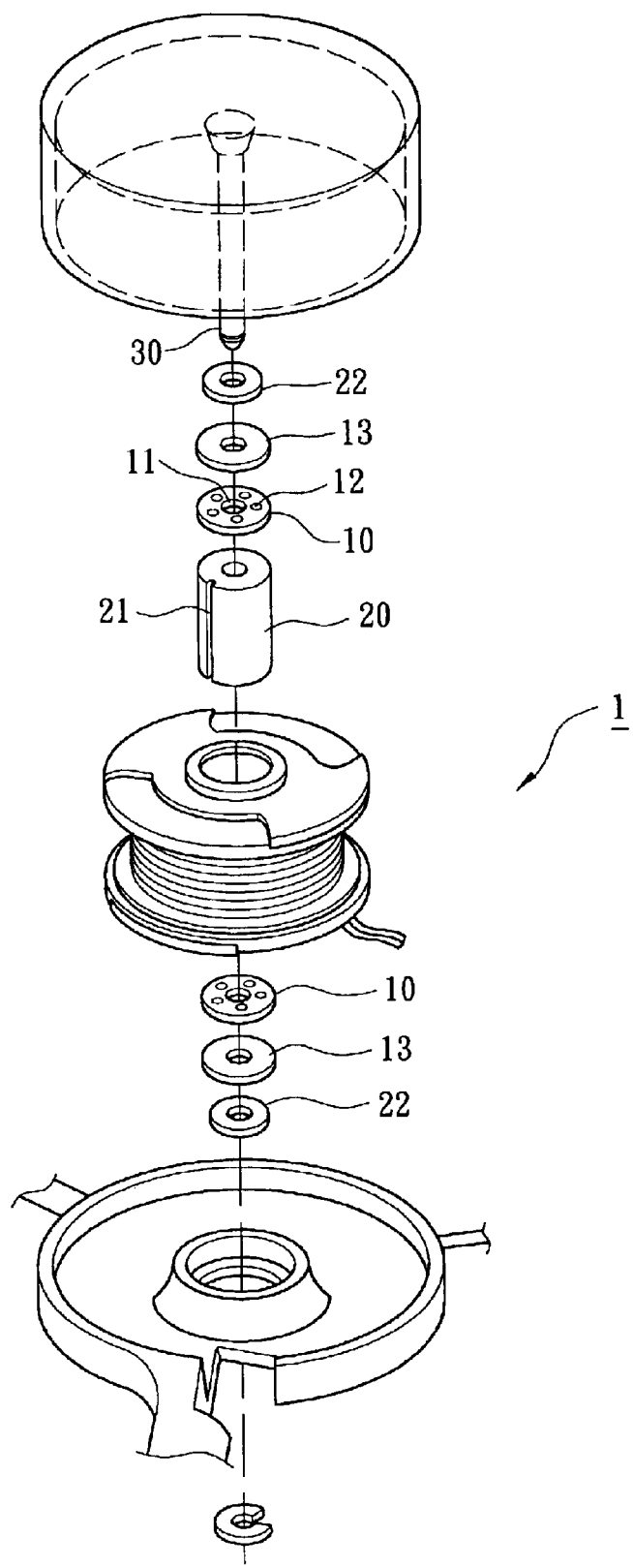
FIG. 4 is a perspective view of a washer having oil-bearing holes assembling in a motor in accordance with a second embodiment of the present invention.
Figure 5:
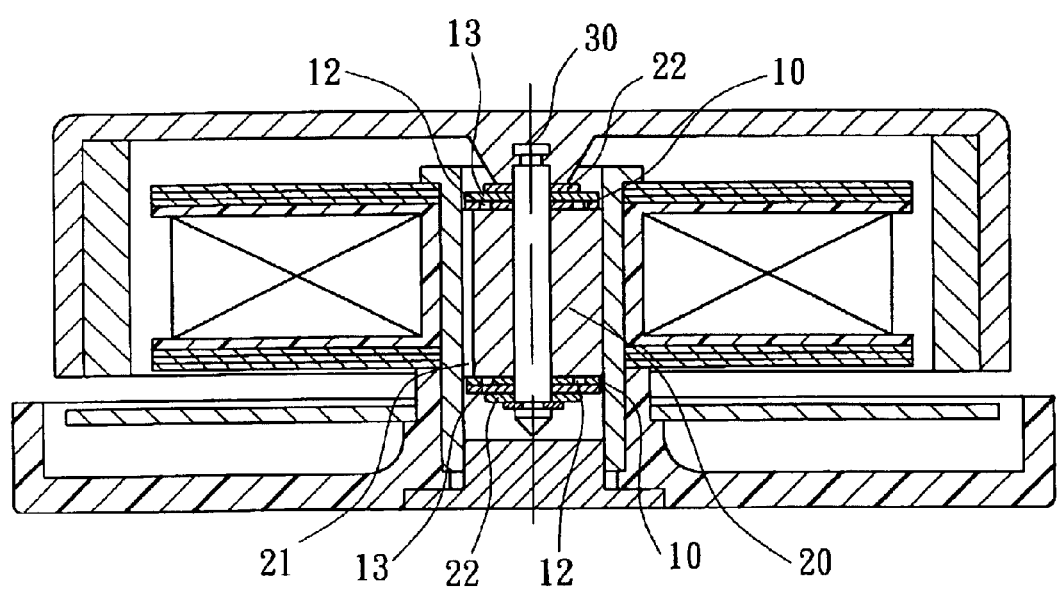
FIG. 5 is a sectional view of the washer having oil-bearing holes assembled in the motor in accordance with the second embodiment of the present invention.

Referring to FIGS. 4 and 5, reference numerals of second embodiment has applied the identical numerals of the first embodiment. The washer 10, the sleeve bearing 20, and the shaft 30 of the second embodiment has the similar configuration and same function as the first embodiment and the detailed descriptions are omitted.

Referring to FIGS. 4 and 5, the washer 10 in accordance with the second embodiment of the present invention further includes an auxiliary washer 13 which is capable of reducing abrasion. The leakage lubricant may flow into a gap between the outer surface of the washer 10 and a surface of the auxiliary washer 13, and collect in the oil-bearing holes 12 to thereby perform buoyancy.

Referring again to FIG. 5, when the shaft 30 is rotated in the sleeve bearing 20, the inner lubricant of the sleeve bearing 20 may leak along the shaft 30 and the leakage lubricant may return to the sleeve bearing 20 in direction of the arrows. Some leakage lubricant may flow into a gap between the inner surface of the washer 10 and the end surface of the sleeve bearing 20 while the other leakage lubricant flowing into a gap between the outer surface of the washer 10 and a surface of the auxiliary washer 13. The leakage lubricant between the outer surface of the washer 10 and a surface of the auxiliary washer 13 may flow back into the oil-bearing holes 12. Meanwhile, the backflow of the leakage lubricant collected in the oil-bearing holes 12 thereby performs buoyancy between the inner surface of the washer 10 and the end surface of the sleeve bearing 20. On the other hand, the total contact area between the inner surface of the washer 10 and the end surface of the sleeve bearing 20 may be reduced due to the oil-bearing holes 12. Consequently, both of the collecting lubricant layer and the reduced contact area between the washer 10 and the sleeve bearing 20 may result in an increase of the rotational efficiency of the shaft 30.

Figure 6:
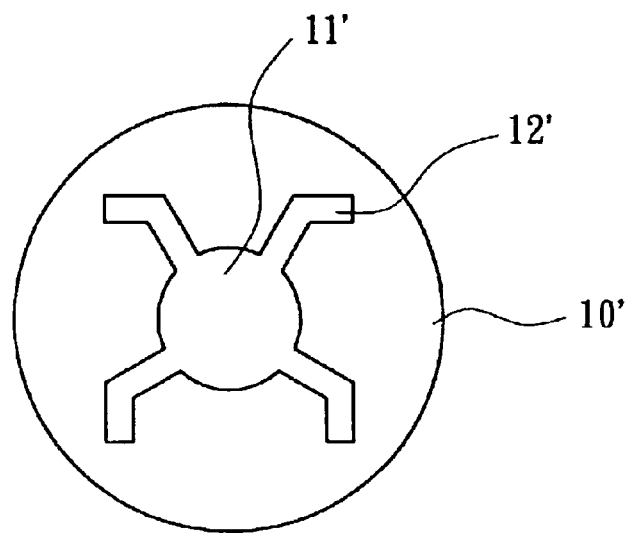
FIG. 6 is an enlarged schematic view of a washer having oil-bearing holes in accordance with a third embodiment of the present invention.
Figure 7:
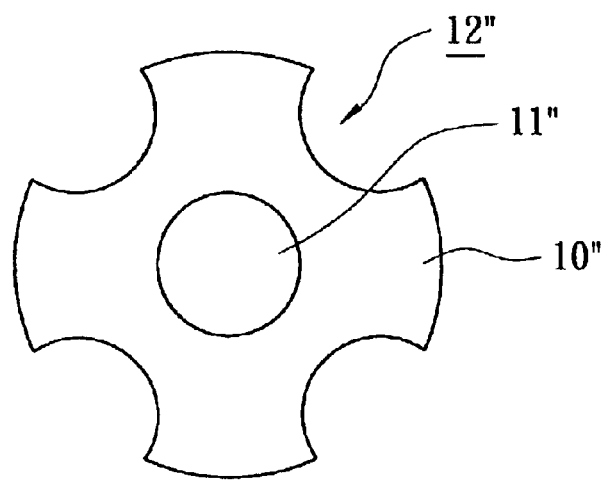
FIG. 7 is an enlarged schematic view of a washer having oil-bearing holes in accordance with a fourth embodiment of the present invention.

Referring to FIGS. 6 and 7, reference numerals of third and fourth embodiments have applied the identical numerals of the first embodiment. The washer 10, the sleeve bearing 20, and the shaft 30 of the third and fourth embodiments have the similar configuration and same function as the first embodiment and the detailed descriptions are omitted.

Referring to FIG. 6, the washer 10' in accordance with the third embodiment of the present invention includes an axial hole 11', and a plurality of oil-bearing holes 12'. The oil-bearing holes 12' are radical slots connecting to an edge of the axial hole 11', and one end of each of the radical slot extends outward from the edge of the axial hole 11'. In addition, each of the oil-bearing holes 12" is comprised of a bent point (not labeled) midway between two ends.

Referring to FIG. 7, the washer 10" in accordance with the fourth embodiment of the present invention includes an axial hole 11", and a plurality of oil-bearing holes 12". The oil-bearing holes 12" are outer recessed edges spaced apart equidistant on an outer circumference of the washer 10, so that outer recessed edges are uniformly surround the axial hole 11".

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A washer applied to an end surface of a bearing and including an inner surface and an outer surface, comprising:
   an axial hole connecting the outer surface to the inner surface, and adapted to receive a shaft;
   at least one oil-bearing hole connecting the inner surface to the outer surface and corresponding to an outer periphery of the axial hole; and
   an elastic member having an end surface in contact with the washer so that the washer is sandwiched in between the elastic member and the bearing,
   wherein when the shaft is rotated, leakage lubricant from the bearing may flow into a gap between the inner surface of the washer and the end surface of the bearing, and collect in the oil-bearing hole.

* * * * *